United States Patent
Hirose et al.

(10) Patent No.: US 9,625,047 B2
(45) Date of Patent: Apr. 18, 2017

(54) FLOW CONTROL VALVE FOR FLOW CONTROLLER

(71) Applicant: Fujikin Incorporated, Osaka (JP)

(72) Inventors: Takashi Hirose, Osaka (JP); Michio Yamaji, Osaka (JP); Toshihide Yoshida, Osaka (JP); Kohei Shigyou, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 13 days.

(21) Appl. No.: 14/780,393

(22) PCT Filed: Mar. 17, 2014

(86) PCT No.: PCT/JP2014/001505
§ 371 (c)(1),
(2) Date: Sep. 25, 2015

(87) PCT Pub. No.: WO2014/156043
PCT Pub. Date: Oct. 2, 2014

(65) Prior Publication Data
US 2016/0047483 A1 Feb. 18, 2016

(30) Foreign Application Priority Data

Mar. 26, 2013 (JP) .................. 2013-064692

(51) Int. Cl.
*F16K 31/00* (2006.01)
*F16K 7/14* (2006.01)
(Continued)

(52) U.S. Cl.
CPC .............. *F16K 31/004* (2013.01); *F16K 7/14* (2013.01); *F16K 25/005* (2013.01); *F16K 27/0236* (2013.01); *F16K 31/007* (2013.01)

(58) Field of Classification Search
CPC .... F16K 31/004; F16K 31/007; F16K 25/005; F16K 27/0236; F16K 7/14
(Continued)

(56) References Cited

U.S. PATENT DOCUMENTS 5,092,360 A * 3/1992 Watanabe ............. F16K 31/007
137/487.5
5,669,408 A 9/1997 Nishino et al.
(Continued)

FOREIGN PATENT DOCUMENTS

EP 0 749 058 A2 12/1996
JP H05-172265 A 7/1993
(Continued)

OTHER PUBLICATIONS

International Search Report, PCT/JP2014/001505, Apr. 15, 2014.

*Primary Examiner* — William McCalister
*Assistant Examiner* — Ian Paquette
(74) *Attorney, Agent, or Firm* — Studebaker & Brackett PC

(57) ABSTRACT

A flow control valve for a flow controller includes a valve main body provided with an open-top valve chamber hole, a metal diaphragm valve element, a lower support cylinder having notches facing each other, an upper support cylinder attached to the lower support cylinder, a support frame horizontally disposed through the notches of the lower support cylinder, a disc spring placed between the support frame and a bottom of the lower support cylinder, a lower cradle placed on the support frame, a piezoelectric element inserted into the support cylinder above the lower cradle, a guide fixed to the valve main body together with the support frame with the support cylinder being inserted through the guide cylinder in a vertically movable manner. The support cylinder is pressed upward by the extension of the piezo- (Continued)

electric element, whereby the metal diaphragm valve element is separated from the valve seat by the elastic force.

14 Claims, 10 Drawing Sheets

(51) Int. Cl.
*F16K 27/02* (2006.01)
*F16K 25/00* (2006.01)

(58) Field of Classification Search
USPC .................. 251/129.01, 129.02, 129.06, 251/129.17–129.19, 61.3–61.5, 337
See application file for complete search history.

(56) References Cited

U.S. PATENT DOCUMENTS

| | | | | |
|---|---|---|---|---|
| 6,345,803 | B2* | 2/2002 | Sakurai | F16K 31/007 251/129.02 |
| 8,162,286 | B2* | 4/2012 | Sawada | F16K 7/14 251/129.02 |
| 8,181,932 | B2* | 5/2012 | Matsumoto | F16K 7/14 251/129.02 |
| 9,163,743 | B2* | 10/2015 | Hidaka | F16K 7/14 |
| 2010/0127196 | A1 | 5/2010 | Sawada et al. | |

FOREIGN PATENT DOCUMENTS

| | | |
|---|---|---|
| JP | H08-338546 A | 12/1996 |
| JP | 2003-120832 A | 4/2003 |
| JP | 4933936 B2 | 2/2012 |

* cited by examiner

FLOW CONTROL VALVE FOR FLOW CONTROLLER

TECHNICAL FIELD

The present invention relates to the improvement of a flow control valve for a flow controller. The present invention relates to a flow control valve for a flow controller, according to which a piezoelectric-element-driven metal diaphragm control valve that forms a flow control valve is simplified in structure and downsized, and also its assembly and maintenance are facilitated, thereby making it possible to achieve further downsizing of a flow controller provided with the flow control valve, an integrated gas feeder for a semiconductor manufacturing device using the flow controller, etc.

BACKGROUND ART

An integrated gas feeder used for a semiconductor manufacturing device or the like is generally configured such that, as shown in FIG. 12, using blocks 54 to 58 provided with a gas channel, two-way of/off valves 51A and 51B, three-way of/off valves 52A and 52B, a flow controller 53, and the like are connected in series to form one gas supply line, and a plurality of such gas supply lines are arranged in parallel and fixed to blocks 55 and 59 (JP-A-5-172265, etc.).

In addition, as the flow controller 53, a thermal mass flow controller or a pressure type flow controller is used, and the inside of each flow controller 53 is provided a flow control valve and a control circuit device thereof. Further, as the flow control valve, a piezoelectric-element-driven metal diaphragm control valve 53a is often used. The valve is configured such that the valve opening is automatically controlled to adjust the fluid flow as desired (JP-A-8-338546, etc.).

FIG. 13 shows an example of the flow control valve, that is, a normal-close piezoelectric-element-driven metal diaphragm control valve, which is often used for a flow controller in an integrated gas feeder, for example. The metal diaphragm control valve is composed of a valve main body 1 having a hole 1a in the upper surface thereof, a metal diaphragm valve element 2, a diaphragm presser 3, a pressing adapter 4, a piezoelectric element support cylinder 23 inserted vertically into the hole 1a, a disc spring 18 provided on the bottom wall of the support cylinder 23, a split base 27 inserted and attached into a lower part of the support cylinder 23, a lower cradle 9 provided in the support cylinder 23, a fixing guide 24 for the support cylinder 23, a piezoelectric element 10 provided in the support cylinder 23, and the like (JP-A-2003-120832).

In addition, FIG. 14 shows an example of a flow control valve configured such that a pressurizing spring 28 is provided between a piezoelectric element support cylinder 23 and a lower cradle 9 provided in the support cylinder 23, and the compressive force constantly applied to the piezoelectric element 10 is suitably adjusted to relax the tension caused upon the contraction of the piezoelectric element 10, thereby preventing the piezoelectric element 10 from breakage (Japanese Patent No. 4933936).

In the piezoelectric-element-driven metal diaphragm control valve of FIG. 13 or FIG. 14, in the steady state, the piezoelectric element support cylinder 23 is pressed downward by the elastic force of the disc spring 18, and the metal diaphragm valve element 2 is butted against a valve seat by the diaphragm presser 3. Thus, the valve is closed.

Then, when a voltage (control signal) is applied to the piezoelectric element 10, the piezoelectric element 10 extends, whereby the support cylinder 23 is pushed upward. Thus, the valve is opened. The reason for this is as follows. Because the lower end surface of the piezoelectric element 10 is supported on the split base 27 via a ball 8a and the lower cradle 9, as a result of the extension of the piezoelectric element 10, the support cylinder 23 whose upper end portion is fixed to an upper part of the piezoelectric element 10 is pushed upward against the elastic force of the disc spring 18, whereby the metal diaphragm valve element 2 that has been pressed is restored to the original state by its elasticity and separated from the valve seat.

The piezoelectric-element-driven metal diaphragm control valves shown in FIG. 13 and FIG. 14, etc., are advantageous in terms of responsiveness and flow controllability. However, because of the configuration in which halved split base segments 27a each provided with a flange are inserted inward from both sides of a piezoelectric element support cylinder 23 to form a split base 27, and a piezoelectric element 10 is supported on the upper surface thereof via a ball 8a and a lower cradle 9, the support mechanism for the piezoelectric element 10 is inevitably complicated, which inevitably makes control valve assembly difficult, resulting in the problem that it is difficult to achieve production cost reduction.

In addition, because of the configuration in which a flanged split base 27 is used, and the flanged split base 27 is fixed to a valve main body 1 by a fixing guide 24 for the support cylinder 23, the outer dimension of the fixing guide 24 naturally increases, resulting in the problem that it is difficult to achieve sufficient reduction of the control valve size.

Further, the integrated gas feeder shown in FIG. 12 is highly effective in that because a fixing bolt is removable from above, it is easy to exchange the control instruments forming each gas supply line, and it is also relatively easy to add more gas supply lines, etc.

However, when the number of gas supply lines required increases, the length dimension L of the integrated gas feeder naturally increases, resulting in an increase in the size of the integrated gas feeder.

The reason for this is as follows. Because of the structure of the flow control valve, there is a certain limit on the length dimension (thickness dimension) Lo of the flow controller 53, and, in either case of a thermal flow controller (mass flow controller) or a pressure type flow controller, a thickness dimension Lo of 20 to 25 mm or more is required.

In particular, in recent years, in an integrated gas feeder for a semiconductor manufacturing device, it has been strongly demanded to increase the number of gas supply lines required, that is, to increase the variety of supplied gases, and there has been a practical demand for an integrated gas feeder capable of supplying a dozen or more kinds of gasses.

In addition, at the same time, significant downsizing of an integrated gas feeder has also been strongly demanded. For example, in a one-chamber multi-process system, it has been practically demanded to fit an integrated gas feeder having 16 kinds of gas supply lines in a volume space of a 350 mm in width W, 250 mm in length L, and 250 mm in height H or smaller.

CITATION LIST

Patent Literature

Patent Document 1: JP-A-5-172265
Patent Document 2: JP-A-8-338546

Patent Document 3: JP-A-2003-120832
Patent Document 4: Japanese Patent No. 4933936

SUMMARY OF INVENTION

Technical Problem

The invention of the present application is aimed at solving the problems of former flow control valves for a flow controller mentioned above, that is, the problems that: (A) because of the configuration in which halved half-split base segments 27a each provided with a flange are inserted inward from openings on both sides of a piezoelectric element support cylinder 23 to form a split base 27, and a piezoelectric element 10 is supported on the upper surface thereof via a ball 8a and a lower cradle 9, the support mechanism for the piezoelectric element 10 is complicated, and the assembly of the control valve is also complicated, making it difficult to achieve production cost reduction; (B) because of the configuration in which a flanged split base 27 is fixed to a valve main body 1 using a fixing guide 24 for a support cylinder 23, the outer dimension of the fixing guide 24 increases, making it difficult to achieve the reduction of the control valve size; (C) because it is difficult to achieve sufficient reduction of the control valve size, it is difficult to provide a flow controller 53 with a length dimension Lo of 20 to 25 mm or less, and, as a result, when the number of gas supply lines increases, the length dimension L of the integrated gas feeder naturally increases, making it difficult to achieve significant downsizing of the integrated gas feeder; etc. The prevent invention is aimed at providing a flow control valve for a flow controller, according to which the flow control valve for a flow regulator is a piezoelectric-element-driven metal diaphragm control valve that does not use a split base 27 or, alternatively, a flow control valve including two piezoelectric-element-driven metal diaphragm control valves integrally combined without using a split base 27. As a result, the structure and assembly can be simplified, the assembly accuracy can be improved, instruments can be downsized, the production cost can be reduced, etc., and further it has also been made possible to meet the demands for an increase in the number of gas supply lines to be integrated and the downsizing of the integrated device.

Solution to Problem

The present inventors have produced, developed, and disclosed various types of normal-close piezoelectric-element-driven metal diaphragm control valves in the past. Through such production and development, they have conceived of significantly downsizing a normal-close piezoelectric-element-driven metal diaphragm control valve, simplifying the assembly, and improving the assembly accuracy to thereby downsize a flow controller and also reduce the production cost, and developed a control valve used therefor.

The present inventors have also conceived of integrally connecting two normal-close piezoelectric-element-driven metal diaphragm control valves and also reducing the control valve size to achieve significant downsizing of a flow controller using the same, thereby reducing the length L of an integrated gas feeder to about ½ that of the former device.

The present invention has been accomplished based on the above conceptions. A first aspect of the present invention is basically configured to include: a valve main body 1 that is provided with an open-top valve chamber hole 1a having a valve seat 6 on a bottom thereof, and a fluid inlet passage 7a and a fluid outlet passage 7b communicating therewith; a metal diaphragm valve element 2 in an inverted dish shape that is disposed above the valve seat 6 to face the same, with an outer periphery thereof being hermetically fixed to a bottom of the valve chamber hole 1a; a pressing screw 5 that is screwed and inserted into the valve chamber hole 1a to press and fix the outer periphery of the metal diaphragm valve element 2; a lower support cylinder 22 that is inserted through the pressing screw 5 into the valve chamber hole 1a, is provided with a diaphragm presser 3 below a bottom wall at a tip portion thereof, and also has, on opposite sides on a side wall thereof, rectangular through notches 22a facing each other and extending from an upper end of the side wall to an intermediate portion; an upper support cylinder 21 in a cylindrical shape that is screwed and attached to an upper end portion of the lower support cylinder 22 to form a support cylinder 23; a disc spring cradle 8 that is placed on a bottom wall of the lower support cylinder 22 and has a disc spring holder 8a; a disc spring 18 that is placed on the disc spring cradle 8; a support frame 16 that is horizontally disposed through the notches 22a of the lower support cylinder 22, has a disc spring cradle guide hole 19 in the center for holding a tip portion of the disc spring holder 8a, and also has, at each end portion thereof, a bolt insertion hole 20 for a fixing bolt 17; a lower cradle 9 that is placed above the disc spring cradle guide hole 19 of the support frame 16; a piezoelectric element 10 that is inserted into the support cylinder 23 above the lower cradle 9; a guide 24 that is provided with a guide cylinder 24a and a flange 24c projecting from a lower end portion thereof toward both sides, and fixed to the valve main body 1 together with the support frame 16 by a fixing bolt 17 with the support cylinder 23 being inserted through the guide cylinder 24a in a vertically movable manner and the flange 24c facing each end portion of the support frame 16; and a positioning nut 12 that is screwed and attached to an upper end portion of the upper support cylinder 21, wherein
the configuration is such that the support cylinder 23 is pushed upward by the extension of the piezoelectric element 10, whereby the metal diaphragm valve element 2 is separated from the valve seat 6 by the elastic force thereof.

In addition, a second aspect of the present invention is basically configured to include: a valve main body 1 that is provided with two open-top valve chamber holes 1a, 1a placed side by side and each having a valve seat 6 on a bottom thereof, and fluid inlet passages 7a, 7a and fluid outlet passages 7b, 7b communicating therewith, respectively; a metal diaphragm valve element 2 in an inverted dish shape that is disposed above each valve seat 6 to face the same, with an outer periphery thereof being hermetically fixed to a bottom of the valve chamber hole 1a; a pressing screw 5 that is screwed and inserted into each valve chamber hole 1a to press and fix the outer periphery of the metal diaphragm valve element 2; a lower support cylinder 22 that is inserted through each pressing screw 5 into the valve chamber hole 1a, is provided with a diaphragm presser 3 below a bottom wall at a tip portion thereof, and also has, on opposite sides on a side wall thereof, rectangular through notches 22a facing each other and extending from an upper end of the side wall to an intermediate portion; an upper support cylinder 21 in a cylindrical shape that is screwed and attached to an upper end portion of each lower support cylinder 22 to form a support cylinder 23; a disc spring cradle 8 that is placed on a bottom wall of each lower support cylinder 22 and has a disc spring holder 8a; a disc spring 18 that is placed on each disc spring cradle 8; a support frame 16 that is horizontally disposed through the notches 22a of the two lower support cylinders 22, has two disc spring cradle guide holes 19, 19 with a space in between for holding tip portions of the respective disc spring holders 8a, and also has, at each end portion thereof, a bolt insertion hole 20 for a fixing bolt 17; a lower cradle 9 that is placed above each disc spring cradle guide hole 19 of the support frame 16; a piezoelectric element 10 that is inserted into the support cylinder 23 above each lower cradle 9; a guide 24 for dual application that is provided with two guide cylinders 24a, 24a and a flange 24c projecting outward from a lower end portion of each guide cylinder 24a, and fixed to the valve main body 1 together with the support frame 16 by a fixing bolt 17 with each support cylinder 23 being inserted through each guide cylinder 24a in a vertically movable manner and the flange 24c facing each end portion of the support frame 16; and a positioning nut 12 that is screwed and attached to an upper end portion of each upper support cylinder 21, wherein the configuration is such that each support cylinder 23 is pushed upward by the extension of each piezoelectric element 10, whereby the metal diaphragm valve element 2 is separated from the valve seat 6 by its elastic force.

According to a third aspect of the present invention, in the first or second aspect of the present invention, a thread 22d is provided on an outer peripheral surface of an upper end portion of the lower support cylinder 22, while a thread 21b is provided on an inner peripheral surface of a lower end portion of the upper support cylinder 21, and the two threads 22d and 21b are screwed together to connect the two support cylinders 22 and 21 to form the support cylinder 23.

According to a fourth aspect of the present invention, in the first or second aspect of the present invention, a connection between the lower support cylinder 22 and the upper support cylinder 21 screwed and attached together is locked by a locking screw 26 that is screwed and attached to an inner peripheral surface of the upper support cylinder 21.

According to a fifth aspect of the present invention, in the first or second aspect of the present invention, a ball 9a is interposed between an upper end surface of the lower cradle 9 and a lower end surface of the piezoelectric element 10.

According to a sixth aspect of the present invention, in the first or second aspect of the present invention, a bearing 14 is interposed between an upper end surface of the piezoelectric element 10 and the positioning nut 13.

According to a seventh aspect of the present invention, in the first or second aspect of the present invention, an O-ring 25 is interposed between an inner peripheral surface of the guide cylinder 24a and an outer peripheral surface of the support cylinder 23.

The present invention may also be configured such that, in the first or second aspect of the present invention, an insertion groove 24b for the support frame 16 is provided at a lower side of the flange 24c of the guide 24.

Advantageous Effects of Invention

According to the first aspect of the present invention, the outer periphery of the metal diaphragm valve element 2 is pressed and fixed by the pressing screw 5 screwed and inserted into the valve chamber hole 1a. At the same time, the lower support cylinder 22, which is provided with the diaphragm presser 3 below the bottom wall at a tip portion thereof and also has, on opposite sides on the side wall thereof, rectangular through notches 22a facing each other and extending from the upper end to an intermediate portion, is inserted through the pressing screw 5 into the valve chamber hole 1a, and the upper support cylinder 21 is screwed and attached to the upper end of the lower support cylinder 22, thereby forming the support cylinder 23. In addition, the disc spring cradle 8 having the disc spring holder 8a and the disc spring 18 held thereby are placed on the bottom wall of the lower support cylinder 22. At the same time, the support frame 16, which has, in an intermediate portion thereof, the disc spring cradle guide hole 19 for holding a tip portion of the disc spring holder 8a and also has, at each end portion thereof, the bolt insertion hole 20 for a fixing bolt 17, is horizontally disposed through the notches 22a of the lower support cylinder 22. Further, the lower cradle 9 is placed above each disc spring cradle guide hole 19 of the support frame 16, and the piezoelectric element 10 is provided thereon. At the same time, the support cylinder is inserted through each guide cylinder 24a in a vertically movable manner, while the flange 24c thereof is positioned to face both ends of the support frame 16, and the guide 24 and the support frame 16 are integrally fixed to the valve main body 1 together with the support frame 16 by a fixing bolt 17.

Accordingly, components forming the control valve, particularly the support mechanism for the disc spring 18 or the piezoelectric element 10, can be significantly simplified. At the same time, the components can be arranged and assembled based on the central axis of the valve chamber hole 1a to assemble the control valve. As a result, the control valve can be provided with a simplified structure and improved assembly accuracy.

The second aspect of the present invention is configured such that the guide 24 and the support frame 16 are for dual application, and the valve main body 1 is provided with two valve chamber holes 1a placed side by side at a predetermined interval. Accordingly, in one valve main body, two control valves can be disposed extremely close to each other, and also the two control valves can be simultaneously assembled and manufactured. As a result, the control valve size can be significantly reduced, and also it is possible to assemble two control valves in a volume approximately similar to that of a former one-valve flow regulator. Thus, the demands for significant downsizing of an integrated gas feeder, etc., and an increase in the number of supply lines can be easily met.

DESCRIPTION OF EMBODIMENTS

Figure 12A:
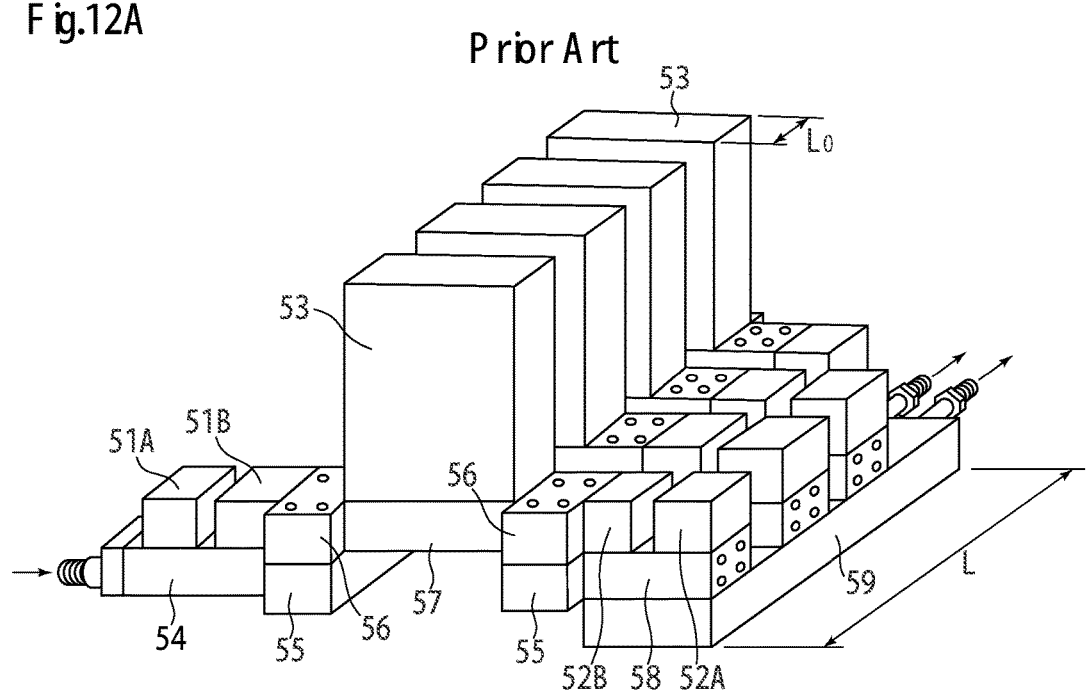
FIG. 12A is a perspective view of a known integrated gas feeder.
Figure 12B:
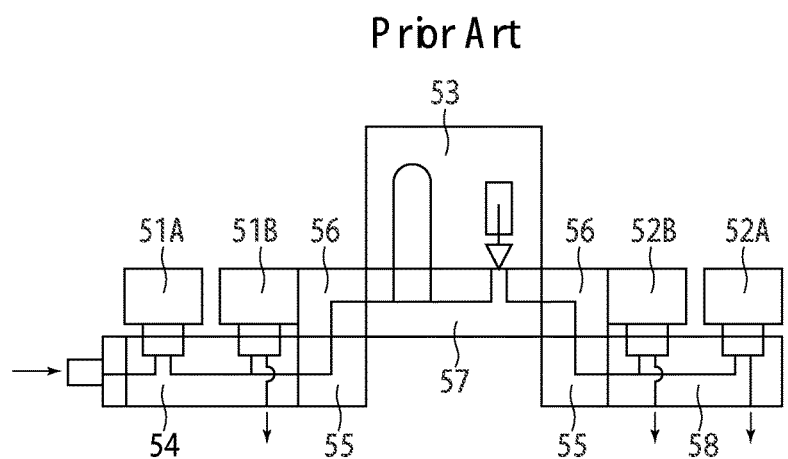
FIG. 12B is a system diagram of a fluid channel (JP-A-5-172265).
Figure 13:
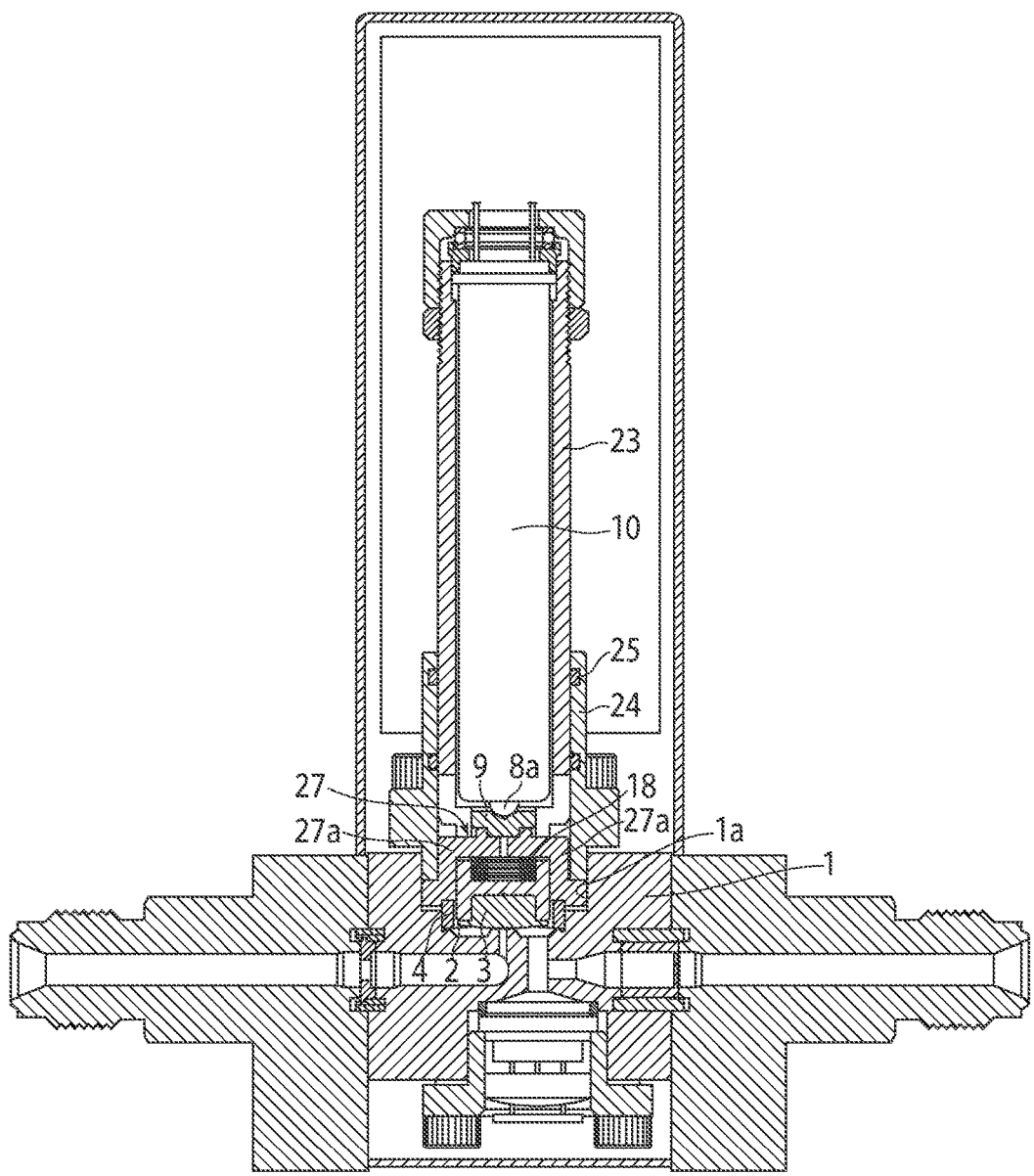
FIG. 13 is a longitudinal cross-sectional view of a known normal-close piezoelectric-element-driven metal diaphragm control valve (JP-A-2003-120832).
Figure 14:
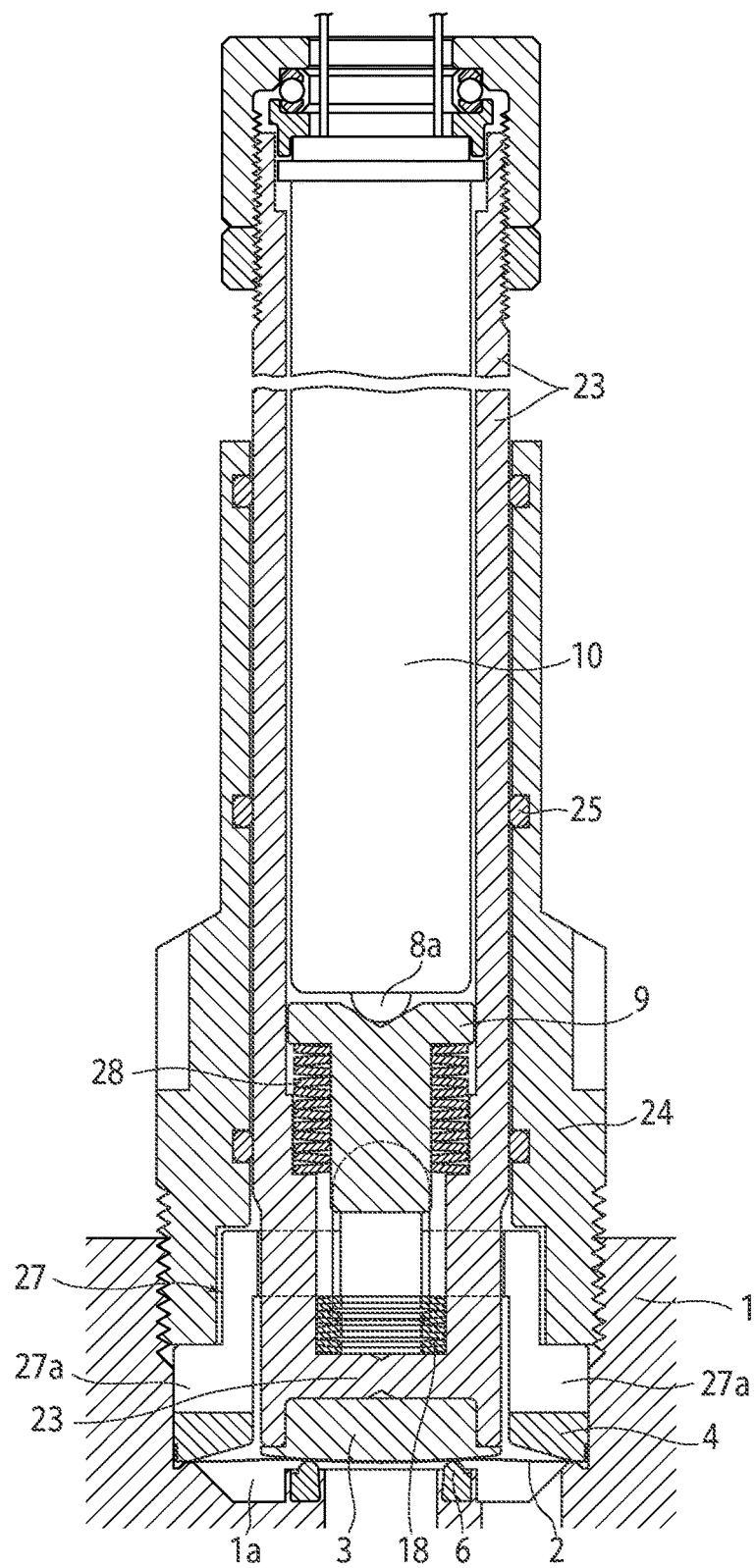
FIG. 14 is a longitudinal cross-sectional view of another known normal-close piezoelectric-element-driven metal diaphragm control valve (Japanese Patent No. 4933936).

Hereinafter, embodiments of the present invention will be described with reference to the drawings. Incidentally, in FIGS. 1 to 11, the same parts and members as in FIGS. 12 to 14 are indicated with the same reference numerals as in FIGS. 12 to 14.

First Embodiment

Figure 1:
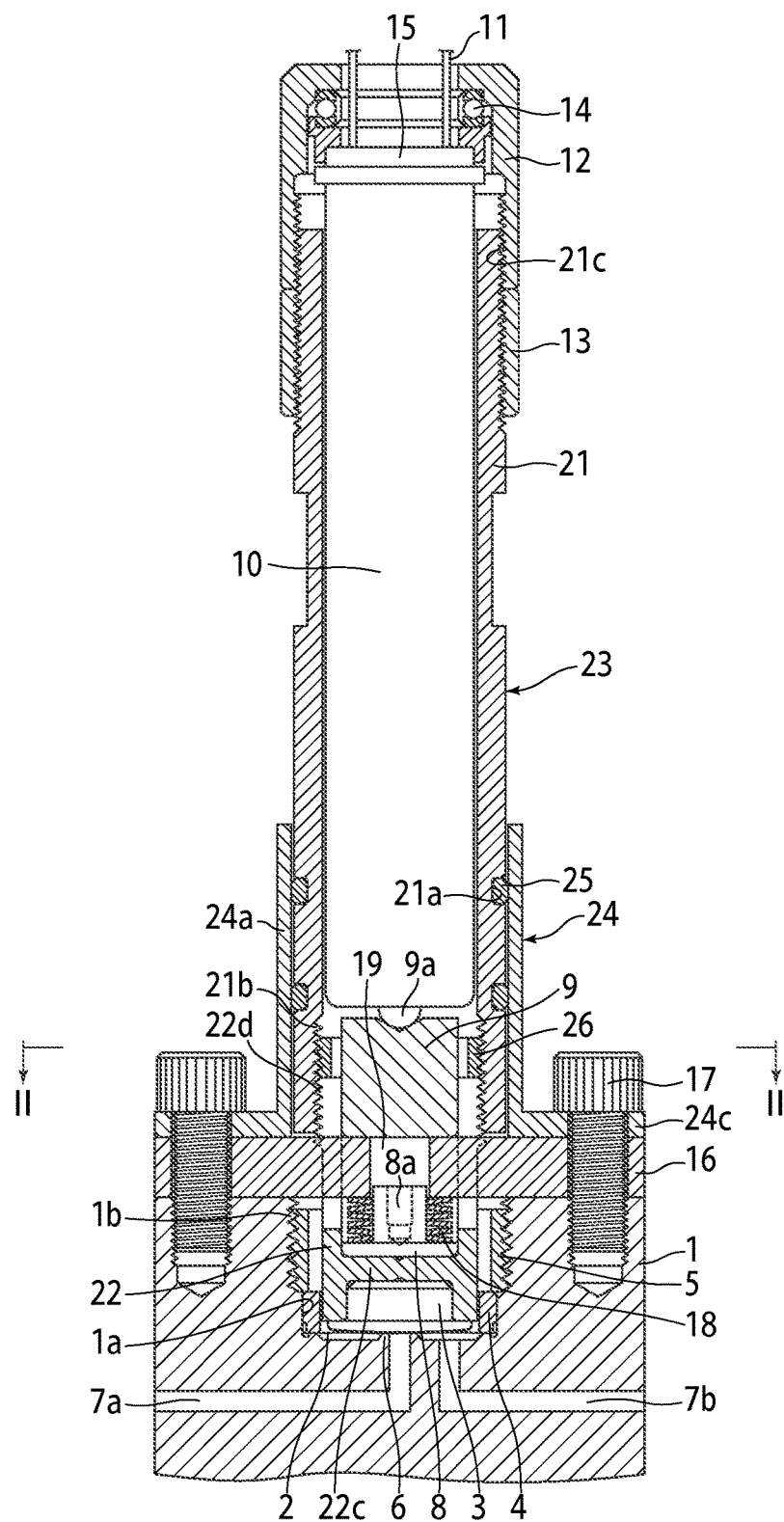
FIG. 1 is a longitudinal cross-sectional view of a normal-close piezoelectric-element-driven metal diaphragm control valve according to a first embodiment of the present invention.
Figure 2:
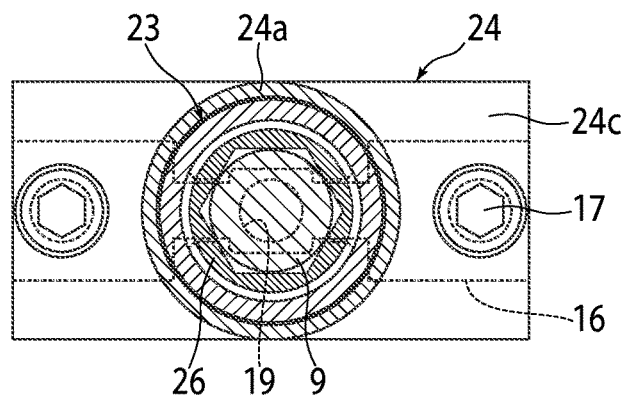
FIG. 2 is a schematic II-II cross-sectional view of FIG. 1.

FIGS. 1 to 8 show a first embodiment of the present invention. FIG. 1 is a longitudinal cross-sectional view of a normal-close piezoelectric-element-driven metal diaphragm control valve according to the first embodiment of the present invention, and FIG. 2 is a schematic II-II cross-sectional view of FIG. 1.

The control valve is composed of a valve main body 1 provided with a valve chamber hole 1a, a metal diaphragm valve element 2 disposed to face a valve seat 6 formed on the bottom of the valve chamber hole 1a, a lower support cylinder 22 for a piezoelectric element 10 inserted above the metal diaphragm valve element 2 in the valve chamber hole 1a, a support frame 16 fixed to the valve main body 1 with a lower support cylinder 22 horizontally inserted therethrough, a disc spring cradle 8 and a disc spring 18 inserted and attached between the support frame 16 and the bottom wall 22c of the lower support cylinder 22, a lower cradle 9 placed on the support frame 16 in the lower support cylinder 22, an upper support cylinder 21 screwed to an upper end portion of the lower support cylinder 22, a piezoelectric element 10 placed on the lower cradle 9, a positioning nut 12 for connecting the upper support cylinder 21 and the piezoelectric element 10, a support cylinder 23 formed of the upper support cylinder 21 and the lower support cylinder 22, a guide 24 for the support cylinder 23, a pressing adapter 4 for the diaphragm valve element 2, a pressing screw 5 formed of a nut provided with a hexagonal hole, a diaphragm presser 3 provided at the lower end of the lower support cylinder 22, etc.

The valve main body 1 is a block made of stainless steel or the like. On the upper surface side thereof, the valve chamber hole 1a is provided, as well as a fluid inlet passage 7a and a fluid outlet passage 7b communicating therewith. Incidentally, in the case where the control valve is used as a control valve for a flow controller, the valve main body 1 may be additionally provided with a pressure sensor mounting hole, a pressure introduction passage, and the like (not illustrated).

In addition, the valve chamber hole 1a has the valve seat 6 formed on the bottom thereof. Further, on the inner peripheral surface of the hole 1a, an internal thread 1b for screwing the below-described pressing screw 5 therein is formed.

The metal diaphragm valve element 2 is formed of an ultra-thin plate material made of a high-elasticity alloy having excellent durability, corrosion resistance, and heat resistance, which is based on cobalt and nickel and also contains tungsten, molybdenum, titanium, chromium, or the like (e.g., SPRON 100), in an inverted dish shape with a central portion thereof bulging upward. The metal diaphragm valve element 2 is disposed to face the valve seat 6, and an outer peripheral portion thereof is hermetically pressed and fixed toward the valve main body 1 side by the pressing screw 5 screwed into the internal thread 1b of the valve chamber hole 1a via the pressing adapter 4.

Figure 7A:
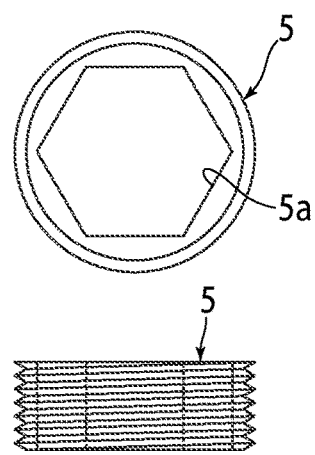
FIG. 7A is a front view and a plan view of a pressing screw.

Incidentally, FIG. 7A is a plan view and a front view of the pressing screw 5. The below-described lower support cylinder 22 is inserted into the central hexagonal hole 5a.

Upon downward pressing, the metal diaphragm valve element 2 is hermetically butted against the valve seat 6, and, upon the loss of the pressing force, it is restored to the original bulging state by its elastic force and thus separated from the valve seat 6. Examples of materials for the metal diaphragm valve element 2 include stainless steel, Inconel, and other alloy steels. Further, it may also has a laminated structure including a plurality of thin plates.

Figure 3A:
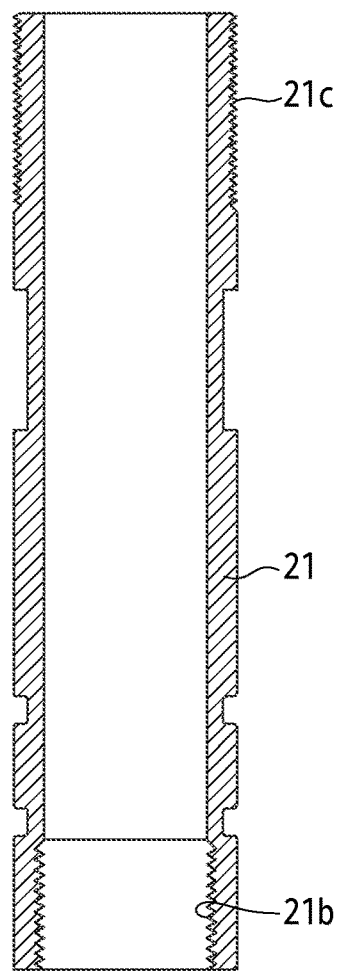
FIG. 3A is a longitudinal cross-sectional view of an upper cylinder.
Figure 3B:
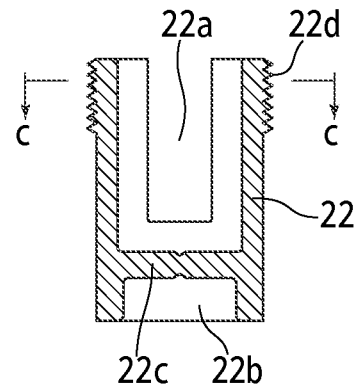
FIG. 3B is a longitudinal cross-sectional view of a lower cylinder.

The support cylinder 23 of the piezoelectric element is formed by screw-connecting the upper support cylinder 21 shown in FIG. 3A and the lower support cylinder 22 shown in FIG. 3B.

That is, on the outer peripheral surface of an upper end portion of the upper support cylinder 21, an external thread 21c for screwing a positioning nut 12 or a locking nut 13 is formed, and, on the inner peripheral surface of a lower part, an internal thread 21b for screw-fixing the lower support cylinder 22 therein is formed.

Figure 7B:
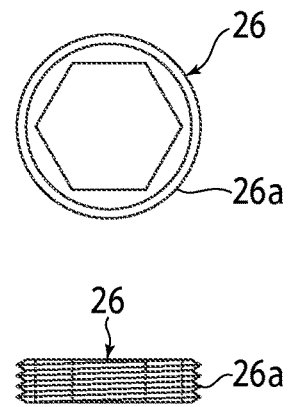
FIG. 7B is a front view and a plan view of a locking screw.

Incidentally, in order to more reliably screw-fixing the upper support cylinder 21 and the lower support cylinder 22, a locking screw 26 as shown in FIG. 7B is screwed into the internal thread 21b on the lower inner peripheral surface of the upper support cylinder 21 to press and fix the upper end surface of the lower support cylinder 22, thereby locking the screw connection. Incidentally, 26a is an external thread of the locking screw 26.

Figure 3C:
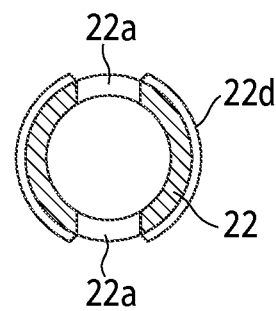
FIG. 3C is a c-c cross-sectional view of the lower cylinder.

In addition, the lower support cylinder 22 is in the form of a closed-end short cylinder as shown in FIG. 3B and FIG. 3C. The wall surface thereof has, on opposite sides, rectangular through notches 22a facing each other and extending from the upper end to an intermediate portion. Through the notches 22a, the below-described support frame 16 is to be horizontally disposed.

Incidentally, on the outer peripheral surface of an upper part of the lower support cylinder 22, an external thread 22d to be screw-fixed into the external thread 21b on the inner peripheral surface of a lower part of the upper support cylinder 21 is provided. In addition, a hollow 22b is provided below the bottom wall 22c of the lower support cylinder 22, and the diaphragm presser 3 is fitted into the hollow 22b.

Figure 4A:
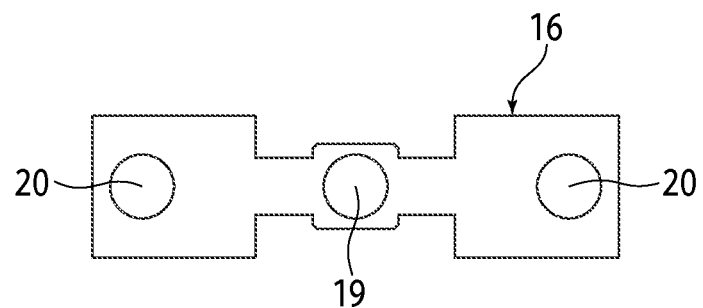
FIG. 4A is a plan view of a support frame.
Figure 4B:
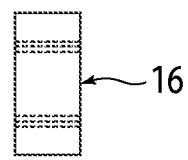
FIG. 4B is a side view thereof.

The support frame 16 is a columnar body in an approximately rectangular shape as shown in FIG. 4A and FIG. 4B. The support frame 16 has the below-described disc spring cradle guide hole 19 formed in a central portion thereof. Further, on each side thereof, an insertion hole 20 for a fixing bolt 17 for fixing the support frame 16 to the outer surface of the valve main body 1 is formed.

Figure 5:
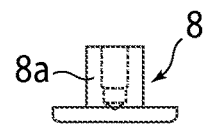
FIG. 5 is a front view of a disc spring cradle.

The disc spring cradle 8 is in an inverted T-shape as shown in FIG. 5, and disposed between the bottom wall 22c of the lower support cylinder 22 and the lower surface of the support frame 16 with the tip of the holder 8a facing the inside of the disc spring cradle guide hole 19.

Figure 6:
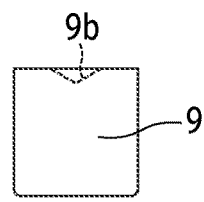
FIG. 6 is a front view of a lower cradle.

The lower cradle 9 of the piezoelectric element 10 is placed on the upper surface of the support frame 16 in the lower support cylinder 22. The lower cradle 9 is in the form of a short column as shown in FIG. 6 and is provided with a receiving groove 9b for a ball 9a in the upper surface thereof.

In addition, the disc spring 18 is mounted on the outer periphery of the holder 8a of the disc spring cradle 8.

When a valve-driving voltage is input to the piezoelectric element 10, the piezoelectric element 10, whose bottom is supported on the support frame 16 via the ball 9a and the lower cradle 9, extends, and the upper support cylinder 21 connected thereto by the positioning nut 12 and the lower support cylinder 22 connected thereto are lifted up against the elastic force of the disc spring 18. As a result, the metal diaphragm valve element 2 is restored to the original form, whereby the valve is opened.

Figure 8A:
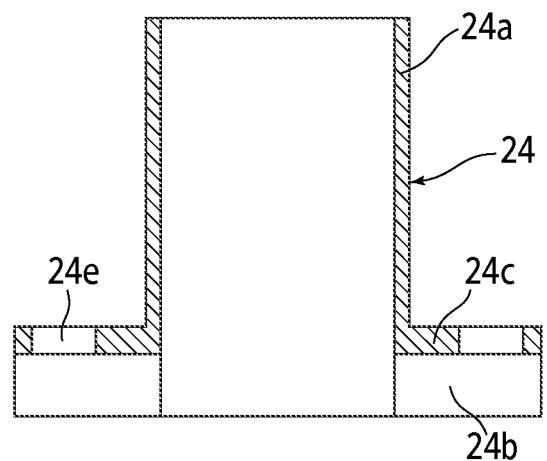
FIG. 8A is a longitudinal cross-sectional view of a guide for a support cylinder.
Figure 8B:
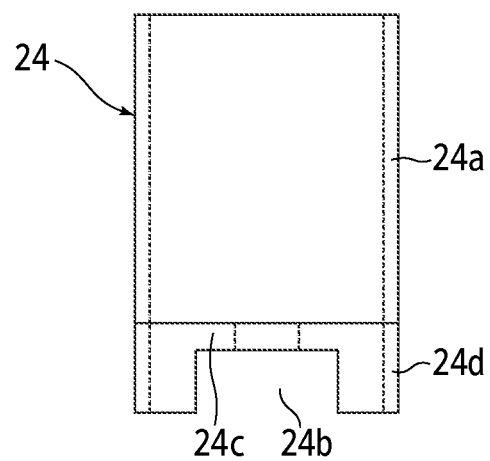
FIG. 8B is a side view thereof.

The guide 24 for the support cylinder 23 is, as shown in FIG. 8A and FIG. 8B, formed of a guide cylinder 24a in the form of a short cylinder and a flange 24c horizontally projecting from a lower end portion thereof toward both sides. At the lower side of the flange 24c, an insertion groove 24b for the support frame 16 is formed. The insertion groove 24b is formed of the flange 24c and a side wall 24d formed by extending each side of the flange 24c downward. Incidentally, the guide 24 is fixed to the outer surface of the valve main body 1 by the fixing bolt 17 with the support cylinder 23 being inserted through the guide cylinder 24a to butt the flange 24c against the upper surface of the support frame 16 and the support frame 16 being engaged in the insertion groove 24b. Incidentally, 24e in FIG. 8A is a bolt insertion hole.

Next, the assembly and operation of the control valve according to the first embodiment will be described.

With reference to FIG. 1, first, the metal diaphragm valve element 2 is placed on the valve seat 6 in the valve chamber hole 1a that forms a valve chamber of the valve main body 1. The pressing adapter 4 is inserted and attached to an upper part of the outer periphery thereof, and the pressing screw 5 is secured into the valve chamber hole 1a to hermetically fix the metal diaphragm valve element 2.

Next, the lower support cylinder 22 is inserted above the metal diaphragm valve element 2 in the valve chamber hole 1a, and a lower part of the lower support cylinder 22 is inserted inward into the pressing screw 5. At the same time, the disc spring cradle 8, the disc spring 18, and the support frame 16 are disposed in the lower support cylinder 22. Subsequently, the lower end portion of the upper support cylinder 21 is screwed into the upper end portion of the lower support cylinder 22, and the locking screw 26 is further screwed thereinto, thereby locking the screwed part of the support cylinders 22 and 21 to prevent them from slackening.

In addition, the upper support cylinder 21 is inserted through the guide 24 for the support cylinder 23 to mount the guide 24 on the valve main body 1. The flange 24c of the guide 24 is butted against the support frame 16, and the guide 24 and the support frame 16 are fixed to the valve main body 1 together by the fixing bolt 17. Further, simultaneously with or after this, the lower cradle 9, the ball 9a, and the piezoelectric element 10 are successively inserted into the support cylinder 23 from the top opening of the upper support cylinder 21, and finally the securing amounts of the positioning nut 12 and the locking nut 13 are adjusted to adjust the stroke of the metal diaphragm valve element 2.

Incidentally, in FIG. 1, 11 is a lead wire, 14 is a bearing, 15 is a connector, 21a is an O-ring insertion groove, and 25 is an O-ring.

With the control valve of the first embodiment, the number of components to form the control valve can be made extremely small, and also its assembly, adjustment, etc., can be performed extremely easily, making it possible to significantly reduce the production cost of a normal-close piezoelectric-element-driven metal diaphragm control valve and also improve the accuracy of valve opening control as compared with former valves of this type.

Second Embodiment

Figure 9:
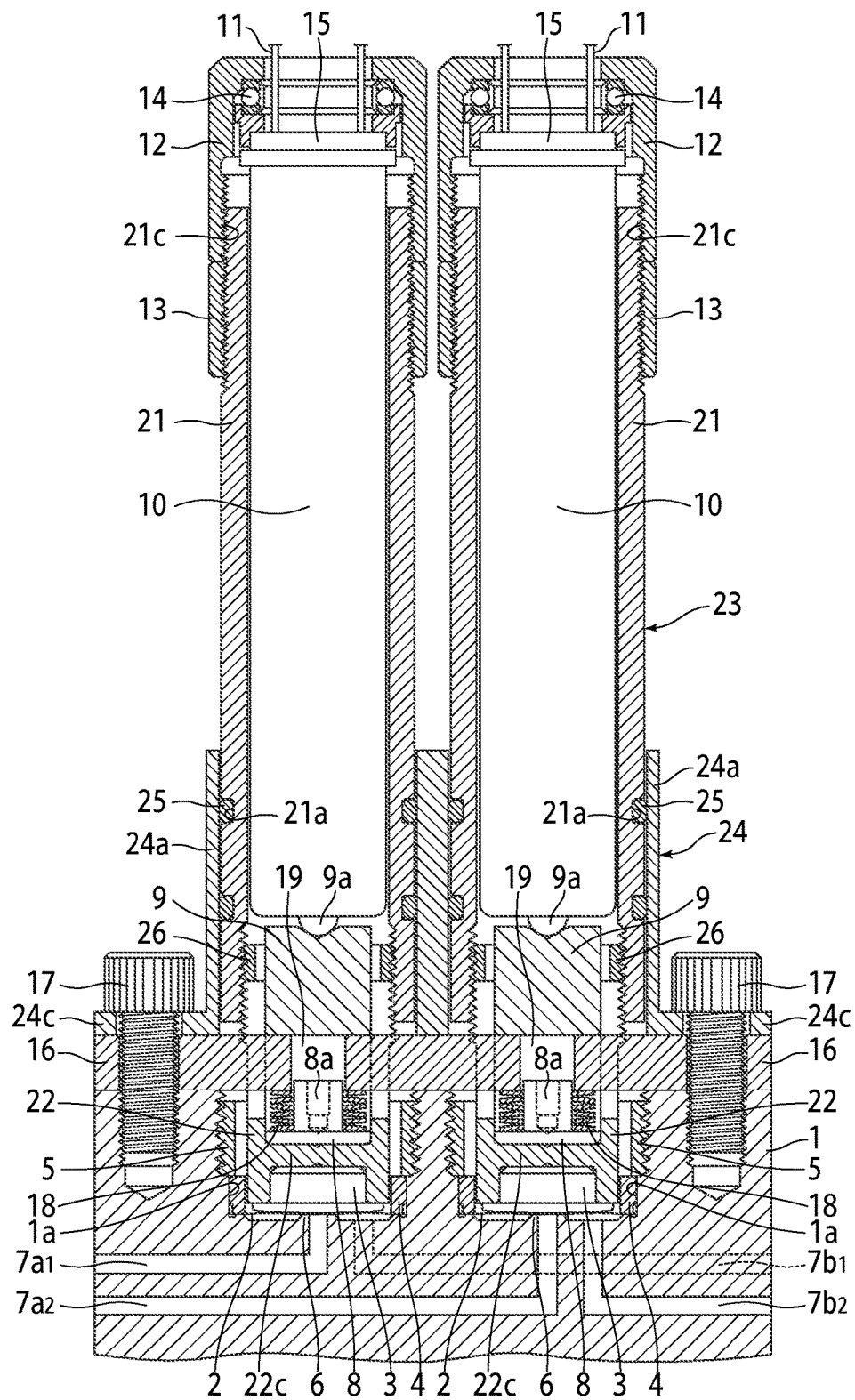
FIG. 9 is a longitudinal cross-sectional view of a normal-close piezoelectric-element-driven metal diaphragm control valve according to a second embodiment of the present invention.
Figure 10:
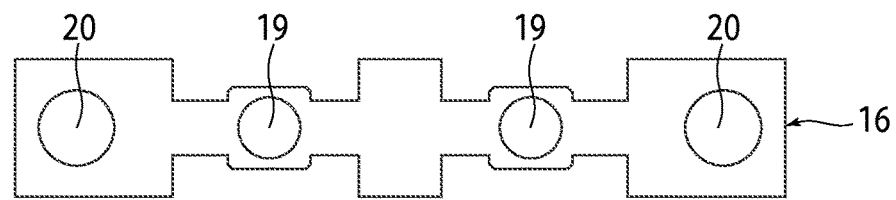
FIG. 10 is a plan view of a support frame for dual application.
Figure 11:
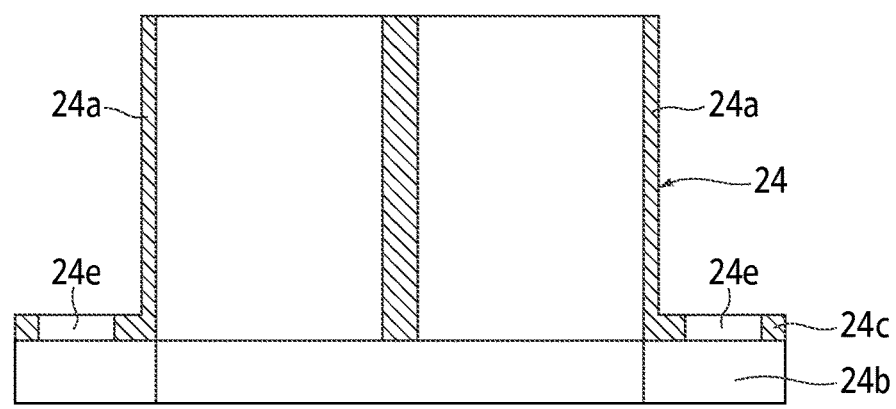
FIG. 11 is a longitudinal cross-sectional view of a guide for dual application.

FIGS. 9 to 11 show a second embodiment of the present invention.

The second embodiment is configured such that two control valves are disposed in parallel close to each other on a valve main body 1, and the two control valves are integrally assembled.

That is, as shown in FIG. 9, on the upper surface side of the valve main body 1, two valve chamber holes 1a are provided at a predetermined interval, and a valve seat 6 is provided on the bottom of each valve chamber hole 1a. In addition, the valve main body 1 is provided with fluid inlet passages $7a_1$ and $7a_2$ and fluid outlet passages $7b_1$ and $7b_2$ communicating with the valve chamber holes 1a, respectively. Further, as in the case of the control valve of FIG. 1, in each valve chamber hole 1a, a metal diaphragm valve element 2 is provided to face the valve seat 6, and an outer peripheral portion thereof is hermetically fixed to the valve main body 1 by a pressing screw 5 via a pressing adapter 4. As the same time, above each metal diaphragm valve element 2, a support cylinder 23 formed of a lower support cylinder 22 and an upper support cylinder 21, a disc spring cradle 8, a disc spring 18, a lower cradle 9, a piezoelectric element 10, and the like are disposed.

Incidentally, in the second embodiment, the valve main body 1 is provided with two valve chamber holes 1a, and the support frame 16 and the guide 24 are each formed for dual application; except for these points, other configurations are almost the same as in the case of the first embodiment. Thus, the detailed description of the configuration of each such point will be omitted.

With reference to FIGS. 9 to 11, in the control valve of the second embodiment, the support frame 16 is formed for dual application as shown in FIG. 10, and two disc spring cradle guide holes 19 are provided at a predetermined interval.

In addition, in the second embodiment, the guide 24 for the support cylinder 23 is formed for dual application as shown in FIG. 11, and two support cylinders 24a are formed in a connected state; except for these points, other configurations are the same as in the case of the first embodiment.

For the assembly of the control valve according to the second embodiment, first, metal diaphragm valve elements 2 are mounted inside respective valve chamber holes 1a, and pressing screws 5 are screwed and inserted thereinto to hermetically fix them. Next, through the inside of each pressing screw 5, a lower support cylinder 22 having a diaphragm presser 3 fixed to the lower end surface thereof is inserted into each valve chamber hole 1a having the metal diaphragm valve element 2 fixed therein. Further, a disc spring cradle 8 equipped with a disc spring 18 is inserted into each lower support cylinder 22. Subsequently, a support frame 16 is horizontally inserted through notches 22a of the lower support cylinders 22 in such a manner that a tip portion of a holder 8a of each disc spring cradle 8 faces the inside of each disc spring cradle guide hole 19 of the support frame 16.

Subsequently, an upper support cylinder 21 is screwed into the upper end of each lower support cylinder 22, and the screw connection is locked and fixed by securing a locking screw 26. At the same time, from above each upper support cylinder 21, a support cylinder 23 equipped with an O-ring 25 is inserted through a guide cylinder 24a, thereby mounting the guide 24 onto the valve main body 1. Then, the flange 24c of the guide 24 and the support frame 16 are secured and fixed to the valve main body 1 by a fixing bolt 17.

Subsequently, the locking screw 26 is secured, and then a lower cradle 9, a ball 9a, a piezoelectric element 10, a bearing 14, a connector 15, and the like are mounted inside each support cylinder 23. At the same time, a positioning nut 12 and a locking nut 13 are screwed and inserted thereinto to adjust the vertical position of each support cylinder 23, that is, the pressing force on each metal diaphragm valve element 2 at the time of closing the control valve, etc.

In the second embodiment, two control valves can be disposed in parallel close to each other. At the same time, because the support frame 16 is shared, the width dimension of the valve main body 1 of the control valve can be made about 60% or less of the width dimension of a valve main body in the case where two independent control valves are placed side by side.

In addition, because two control valves can be assembled simultaneously in parallel, the number of control valve assembling steps does not significantly increase as compared with the case of assembling one control valve, and high-efficiency and high-accuracy assembly is possible.

In addition, in the case where the control valve according to the second embodiment of the present application is applied to the integrated gas feeder shown in FIG. 12, the length dimension L of the integrated gas feeder can be reduced by half or less. Accordingly, the demand for an increase in the number of supply gas lines can be easily met without causing a significant increase in the installation space for the integrated gas feeder.

INDUSTRIAL APPLICABILITY

The present invention is applicable not only to a fluid channel on/off control valve, a control valve for a flow controller, and a control valve for an integrated gas feeder in the field of semiconductor manufacturing devices, but also for fluid channel off/off control and fluid flow control in any industrial field.

REFERENCE SIGNS LIST

1: Valve main body
1a: Valve chamber hole
1b: Internal thread
2: Metal diaphragm valve element
3: Diaphragm presser
4: Pressing adapter
5: Pressing screw
5a: Hole
6: Valve seat
7a, 7a$_1$: Fluid inlet passage
7b, 7b$_2$: Fluid outlet passage
8: Disc spring cradle
8a: Holder
9: Lower cradle
9a: Ball
10: Piezoelectric element
11: Lead wire
12: Positioning nut
13: Locking nut
14: Bearing
15: Connector
16: Support frame
17: Fixing bolt
18: Disc spring
19: Disc spring cradle guide hole
20: Bolt insertion hole
21: Upper support cylinder
21a: O-ring insertion groove
21b: Internal thread
21c: External thread
21d: Side wall
21e: Bolt insertion hole
22: Lower support cylinder
22a: Notch
22b: Hollow
22c: Bottom wall
22d: External thread
23: Support cylinder
24: Guide
24a: Guide cylinder
24b: Support frame insertion groove
24c: Flange
24d: Side wall
24e: Bolt insertion hole
25: O-ring
26: Locking screw
26a: External thread

The invention claimed is:

1. A flow control valve for a flow controller, comprising:
a valve main body provided with an open-top valve chamber hole having a valve seat on a bottom, a fluid inlet passage communicating with the valve chamber hole, and a fluid outlet passage communicating with the valve chamber hole;
a metal diaphragm valve element in an inverted dish shape disposed above the valve seat to face the valve seat, with an outer periphery being hermetically fixed to the bottom of the valve chamber hole;
a pressing screw screwed and inserted into the valve chamber hole to press and fix the outer periphery of the metal diaphragm valve element;
a lower support cylinder inserted through the pressing screw into the valve chamber hole, provided with a diaphragm presser below a bottom wall at a tip portion, and also having, on a side wall, rectangular through notches extending from an upper end of the side wall to an intermediate portion of the side wall;
an upper support cylinder in a cylindrical shape screwed and attached to an upper end portion of the lower support cylinder to form a support cylinder;
a disc spring cradle placed on a bottom wall of the lower support cylinder and having a disc spring holder;
a disc spring placed on the disc spring cradle;
a support frame horizontally disposed through the notches of the lower support cylinder, having a disc spring cradle guide hole in the center for holding a tip portion of the disc spring holder, and also having, at each end portion, a bolt insertion hole for a fixing bolt;
a lower cradle placed above the disc spring cradle guide hole of the support frame;
a piezoelectric element inserted into the support cylinder above the lower cradle;

a guide provided with a guide cylinder and a flange projecting from a lower end portion of the guide cylinder toward both sides, and fixed to the valve main body together with the support frame by a fixing bolt with the support cylinder being inserted through the guide cylinder in a vertically movable manner and the flange facing each end portion of the support frame; and a positioning nut screwed and attached to an upper end portion of the upper support cylinder, wherein the flow control valve for a flow controller is configured such that the support cylinder is pushed upward by the extension of the piezoelectric element, whereby the metal diaphragm valve element is separated from the valve seat by the elastic force of the metal diaphragm valve element.

2. The flow control valve for a flow controller according to claim 1, wherein a thread is provided on an outer peripheral surface of an upper end portion of the lower support cylinder, while a thread is provided on an inner peripheral surface of a lower end portion of the upper support cylinder, and the two threads are screwed together to connect the two support cylinders to form the support cylinder.

3. The flow control valve for a flow controller according to claim 1, wherein a connection between the lower support cylinder and the upper support cylinder screwed and attached together is locked by a locking screw that is screwed and attached to an inner peripheral surface of the upper support cylinder.

4. The flow control valve for a flow controller according to claim 1, wherein a ball is interposed between an upper end surface of the lower cradle and a lower end surface of the piezoelectric element.

5. The flow control valve for a flow controller according to claim 1, wherein a bearing is interposed between an upper end surface of the piezoelectric element and the positioning nut.

6. The flow control valve for a flow controller according to claim 1, wherein an O-ring is interposed between an inner peripheral surface of the guide and an outer peripheral surface of the support cylinder.

7. The flow control valve for a flow controller according to claim 1, wherein an insertion groove for the support frame is provided at a lower side of the flange of the guide.

8. A flow control valve for a flow controller, comprising:
a valve main body provided with two open-top valve chamber holes placed side by side and each having a valve seat on a bottom, a fluid inlet passage communicating with each valve chamber hole, and a fluid outlet passage communicating with each valve chamber hole;
a metal diaphragm valve element in an inverted dish shape disposed above each valve seat to face the valve seat, with an outer periphery thereof being hermetically fixed to the bottom of the valve chamber hole;
a pressing screw screwed and inserted into each valve chamber hole to press and fix the outer periphery of the metal diaphragm valve element;
a lower support cylinder inserted through each pressing screw into the valve chamber hole, provided with a diaphragm presser below a bottom wall at a tip portion thereof, and also having, on a side wall, rectangular through notches extending from an upper end of the side wall to an intermediate portion of the side wall;
an upper support cylinder in a cylindrical shape screwed and attached to an upper end portion of each lower support cylinder to form a support cylinder;
a disc spring cradle placed on a bottom wall of each lower support cylinder and having a disc spring holder;
a disc spring placed on each disc spring cradle;
a support frame horizontally disposed through the notches of the two lower support cylinders, having two disc spring cradle guide holes with a space in between for holding tip portions of the respective disc spring holders, and also having, at each end portion thereof, a bolt insertion hole for a fixing bolt;
a lower cradle placed above each disc spring cradle guide hole of the support frame;
a piezoelectric element inserted into the support cylinder above each lower cradle;
a guide for dual application provided with two guide cylinders and a flange projecting outward from a lower end portion of each guide cylinder, and fixed to the valve main body together with the support frame by a fixing bolt with each support cylinder being inserted through each guide cylinder in a vertically movable manner and the flange facing each end portion of the support frame; and
a positioning nut screwed and attached to an upper end portion of each upper support cylinder, wherein
the flow control valve for a flow controller is configured such that each support cylinder is pushed upward by the extension of each piezoelectric element, whereby the metal diaphragm valve element is separated from the valve seat by the elastic force of the metal diaphragm valve element.

9. The flow control valve for a flow controller according to claim 2, wherein a thread is provided on an outer peripheral surface of an upper end portion of the lower support cylinder, while a thread is provided on an inner peripheral surface of a lower end portion of the upper support cylinder, and the two threads are screwed together to connect the two support cylinders to form the support cylinder.

10. The flow control valve for a flow controller according to claim 2, wherein a connection between the lower support cylinder and the upper support cylinder screwed and attached together is locked by a locking screw that is screwed and attached to an inner peripheral surface of the upper support cylinder.

11. The flow control valve for a flow controller according to claim 2, wherein a ball is interposed between an upper end surface of the lower cradle and a lower end surface of the piezoelectric element.

12. The flow control valve for a flow controller according to claim 2, wherein a bearing is interposed between an upper end surface of the piezoelectric element and the positioning nut.

13. The flow control valve for a flow controller according to claim 2, wherein an O-ring is interposed between an inner peripheral surface of the guide and an outer peripheral surface of the support cylinder.

14. The flow control valve for a flow controller according to claim 2, wherein an insertion groove for the support frame is provided at a lower side of the flange of the guide.

* * * * *